(12) United States Patent
Wood et al.

(10) Patent No.: US 7,664,269 B2
(45) Date of Patent: *Feb. 16, 2010

(54) ENCRYPTING MESSAGE FOR SECURE TRANSMISSION

(75) Inventors: Matthew D. Wood, Hillsboro, OR (US); Gary L. Graunke, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 642 days.

This patent is subject to a terminal disclaimer.

(21) Appl. No.: 11/013,572

(22) Filed: Dec. 15, 2004

(65) Prior Publication Data

US 2007/0189534 A1    Aug. 16, 2007

Related U.S. Application Data

(62) Division of application No. 09/822,548, filed on Mar. 30, 2001, now abandoned.

(51) Int. Cl.
*H04L 9/08* (2006.01)
*H04L 9/30* (2006.01)
*H04K 1/00* (2006.01)

(52) U.S. Cl. .................. 380/284; 380/285; 380/28; 380/44

(58) Field of Classification Search .......... 380/284, 380/285, 28, 44
See application file for complete search history.

(56) References Cited

U.S. PATENT DOCUMENTS

| 5,956,406 | A | * | 9/1999 | Maldy | .......................... 380/30 |
| 6,061,819 | A | | 5/2000 | Bening et al. | |
| 6,073,242 | A | | 6/2000 | Hardy et al. | |
| 6,182,220 | B1 | | 1/2001 | Chen et al. | |
| 6,253,223 | B1 | | 6/2001 | Sprunk | |
| 6,601,170 | B1 | | 7/2003 | Wallace, Jr. | |
| 6,628,786 | B1 | * | 9/2003 | Dole | ........................... 380/44 |
| 6,687,375 | B1 | * | 2/2004 | Matyas et al. | ................. 380/45 |
| 6,772,340 | B1 | | 8/2004 | Peinado et al. | |
| 6,931,128 | B2 | | 8/2005 | Roberts | |
| 6,948,065 | B2 | * | 9/2005 | Grawrock | .................... 713/168 |
| 7,242,766 | B1 | * | 7/2007 | Lyle | .............................. 380/2 |

FOREIGN PATENT DOCUMENTS

JP    08037138    2/1996

OTHER PUBLICATIONS

Jablon, David P. "RE: Secret pubic keys" posted Jul. 25, 1999, pp. 1-2. <http://www.vpnc.org/ietf-ipsec/99.ipsec/msg01334.html>.*
Gutmann, Peter, "Software Generation of Practically Strong Random Numbers," Proceedings of the 7th USENIX Security Symposium, Jan. 26-29, 1998, pp. 1-15.*
Foldoc, Definition of "client server," Jan. 25, 1998, p. 1 <http://wombat.doc.ic.ac.uk/foldoc.cgi?client-server>.
"Using IBM Local Area Network Server to Support Redundant Resources and Balance Licenses," IBM Technical Disclosure Bulletin Apr. 1997, pp. 1-5.

(Continued)

*Primary Examiner*—Michael Pyzocha
(74) *Attorney, Agent, or Firm*—Blakely, Sokoloff, Taylor & Zafman LLP

(57) ABSTRACT

A system, apparatus, and method are provided for enhancing entropy in a pseudo-random number generator (PRNG) using remote sources. According to one embodiment of the present invention, first, the PRNG's internal state is initialized. Local seeding information is then obtained from a local host. For added security, additional seeding information is obtained from one or more remote entropy servers operating independently to each maintain a constantly updated state pool. Finally, the PRNG is stirred based upon the local seeding information, and the additional seeding information.

15 Claims, 7 Drawing Sheets

OTHER PUBLICATIONS

Menezes, et al., "Handbook of Applied Cryptography," 1997, pp. 25-28, 31-32, 494, 506-508.

Menezes, et al., "Handbook of Applied Cryptography," 1997, pp. 170-171.

* cited by examiner

ENCRYPTING MESSAGE FOR SECURE TRANSMISSION

CROSS-REFERENCE TO RELATED APPLICATION

This Application is divisional of application Ser. No. 09/822,548, entitled "Enhancing Entropy in Pseudo-Random Number Generators Using Remote Sources", filed Mar. 30, 2001 now abandoned.

FIELD OF THE INVENTION

Embodiment of the invention relate to enhancing entropy. One embodiment relates to entropy amplification in pseudo-random numbers using remote sources.

BACKGROUND

Securing data through encryption/decryption methods, especially, when transmitting it over insecure channels, from cryptographic attacks is widely known. Traditionally, a method of symmetric encryption was used to secure the information between two users. The method of symmetric encryption required creating a single secret key known only to the two users. However, the secrecy was only guaranteed to the extent the two users kept the key secret. Additionally, the method of prior exchange of the key made the system even more cumbersome. To make the system more secure and reliable, the public-key system was introduced.

In a public-key system, also known as the asymmetric or two-key system, each user's key has a public and private component. The public component generates public encryption, while the private component generates private decryption of the encrypted text. This makes the system much more secure, because it is difficult to break an encryption, unless the corresponding private key is also known.

A typical public-key system uses a pseudo-random number generator (PRNG) to generate random numbers through a deterministic process. Consequently, the security of such system is dependent upon having a strong pseudo-random number generation (PRNG) algorithm. A PRNG uses a random internal state and a process called stirring to produce a stream of bits that satisfy various statistical tests of cryptographic randomness. The internal state is initialized with a random value called a seed. The seed must have a high level of entropy to ensure that the stream of bits are sufficiently hard to guess. Existing methods of gathering entropy use information gathered from a local system to seed the PRNG. If the seed gathered from the local system does not have sufficient entropy, an attacker can guess the output of the PRNG with relative ease, and break the system. This is especially true in constrained environments such as the Java Virtual Machine.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

A method and apparatus are described for enhancing entropy in a pseudo-random number generator using a remote source. Broadly stated, embodiments of the present invention allows the stirring of a pseudo-random number generator using both the local seeding information and, for additional security, remote seeding information generated by remote entropy servers.

According to one embodiment, one or more remote entropy servers generate seeding information, which is securely gathered along with the local seeding information. An attacker can easily break into a system using only the local seeding information, and predict the state of a PRNG. The use of the remote seeding information adds to the randomness of the PRNG making a system much more secure from cryptographic attacks. Protecting systems from cryptographic attacks by enhancing entropy using remote sources can secure all types of transactions, such as emailing, baking transactions, and communication between applications.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps of the present invention may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software.

The present invention may be provided as a computer program product, which may include a machine-readable medium having stored thereon instructions which may be used to program a computer (or other electronic devices) to perform a process according to the present invention. The machine-readable medium may include, but is not limited to, floppy diskettes, optical disks, Compact-Disk Read Only Memories (CD-ROMs), and magneto-optical disks, ROMs, Random Access Memories (RAMs), Erasable Programmable ROMs (EPROMs), Electrically EPROMs (EEPROMs), magnetic or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Figure 1:
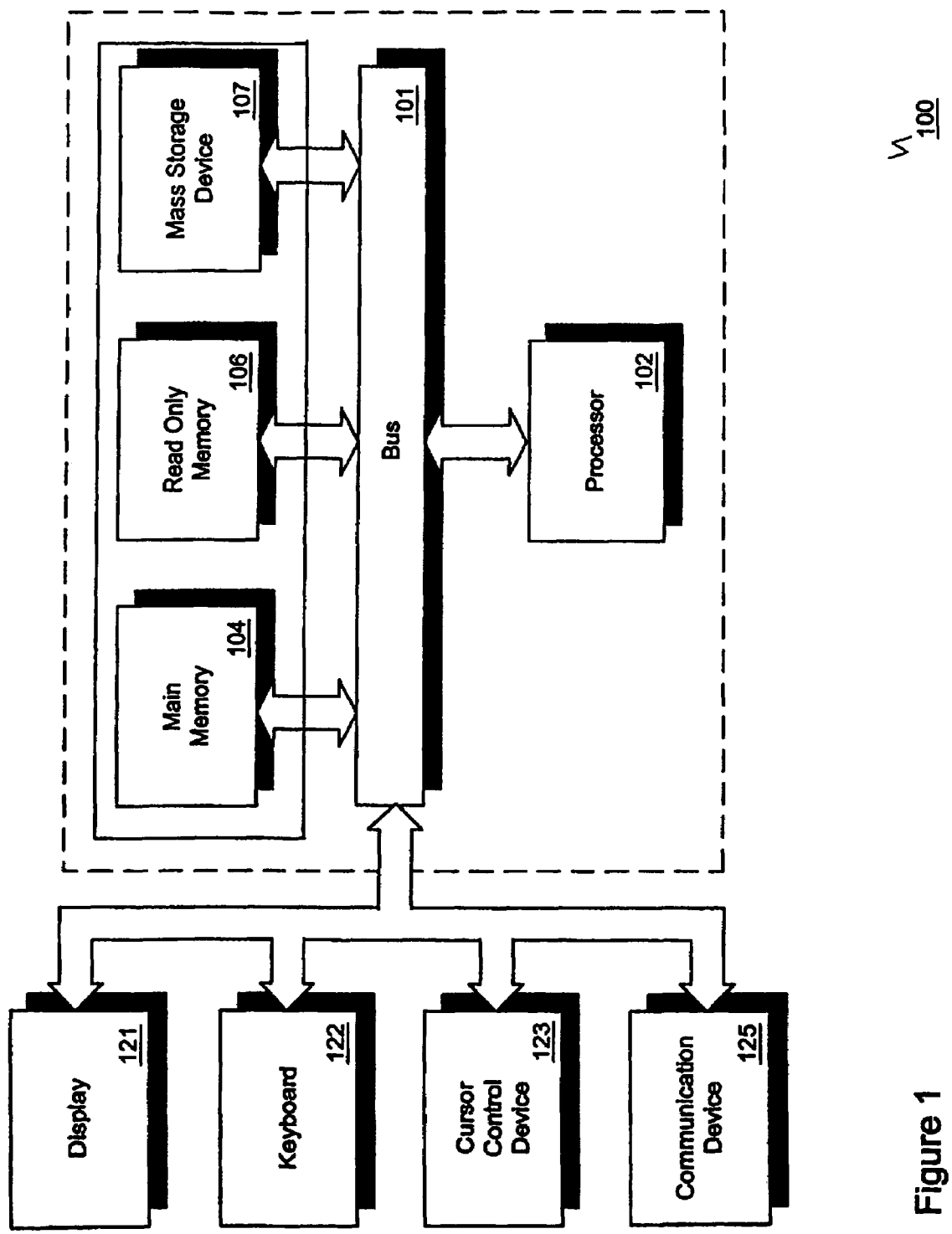
FIG. 1 is a block diagram of a typical computer system upon which one embodiment of the present invention may be implemented.

FIG. 1 is a block diagram of a typical computer system upon which one embodiment of the present invention may be implemented. Computer system 100 comprises a bus or other communication means 101 for communicating information, and a processing means such as processor 102 coupled with bus 101 for processing information. Computer system 100 further comprises a RAM or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102.

A data storage device 107 such as a magnetic disk or optical disc and its corresponding drive may also be coupled to computer system 100 for storing information and instructions. Computer system 100 can also be coupled via bus 101 to a display device 121, such as a cathode ray tube (CRT) or Liquid Crystal Display (LCD), for displaying information to an end user. Typically, an alphanumeric input device 122, including alphanumeric and other keys, may be coupled to bus 101 for communicating information and/or command selections to processor 102. Another type of user input device is cursor control 123, such as a mouse, a trackball, or cursor direction keys for communicating direction information and command selections to processor 102 and for controlling cursor movement on display 121.

A communication device 125 is also coupled to bus 101. The communication device 125 may include a modem, a network interface card, or other well-known interface devices, such as those used for coupling to Ethernet, token ring, or other types of physical attachment for purposes of providing a communication link to support a local or wide area network, for example. In this manner, the computer system 100 may be coupled to a number of clients and/or servers via a conventional network infrastructure, such as a company's Intranet and/or the Internet, for example.

It is appreciated that a lesser or more equipped computer system than the example described above may be desirable for certain implementations. Therefore, the configuration of computer system 100 will vary from implementation to implementation depending upon numerous factors, such as price constraints, performance requirements, technological improvements, and/or other circumstances.

It should be noted that, while the steps described herein may be performed under the control of a programmed processor, such as processor 102, in alternative embodiments, the steps may be fully or partially implemented by any programmable or hard-coded logic, such as Field Programmable Gate Arrays (FPGAs), Transistor Transistor Logic (TTL), or Application Specific Integrated Circuits (ASICs), for example. Additionally, the method of the present invention may be performed by any combination of programmed general-purpose computer components and/or custom hardware components. Therefore, nothing disclosed herein should be construed as limiting the present invention to a particular embodiment wherein the recited steps are performed by a specific combination of hardware components.

Figure 2:
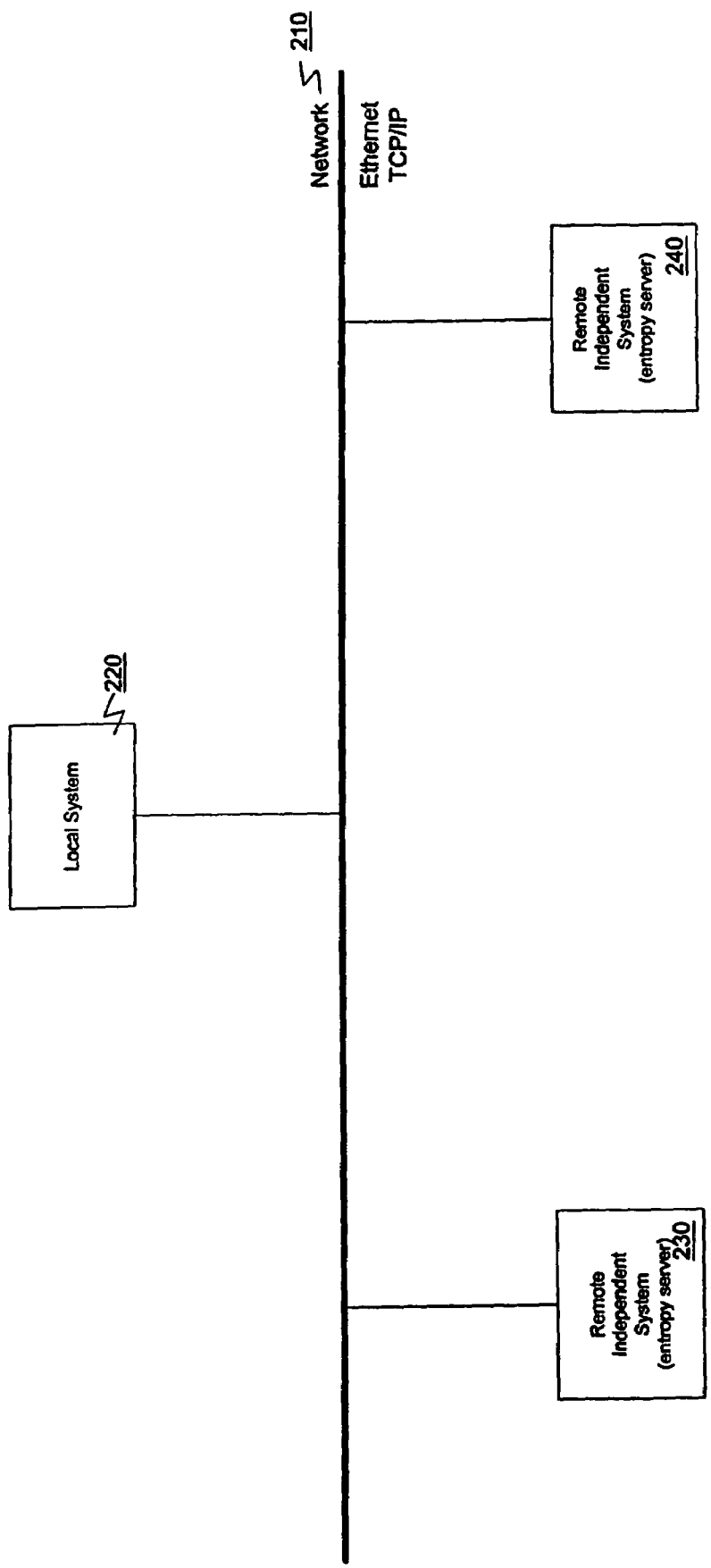
FIG. 2 is a block diagram illustrating an exemplary network upon which the present invention may be implemented.

FIG. 2 is a block diagram illustrating an exemplary network upon which the present invention may be implemented. In this example, an Ethernet network 210 is shown. Such a network may utilize Transmission Control Protocol/Internet Protocol (TCP/IP). Of course, many other types of networks and protocols are available and are commonly used. However, for illustrative purposes, Ethernet and TCP/IP will be referred.

Connected to this network 210 is a local system 220. In addition to the local system 220, one or more remote independent systems 230 and 240 are connected to the network 210. As illustrated, the remote independent systems 230 and 240 include entropy servers 230 and 240. The number and arrangement of this equipment may vary depending on the application.

Figure 3A:
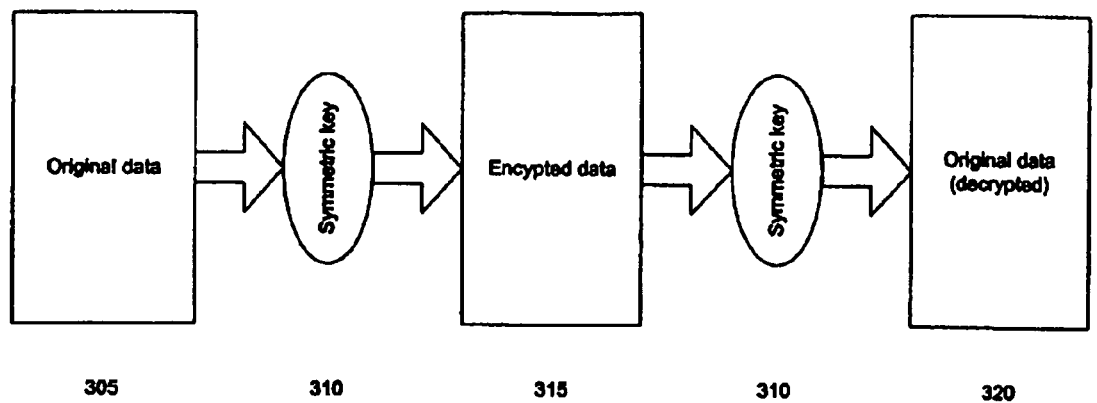
FIG. 3 is a block diagram illustrating symmetric-key and public-key encryptions.
Figure 3B:
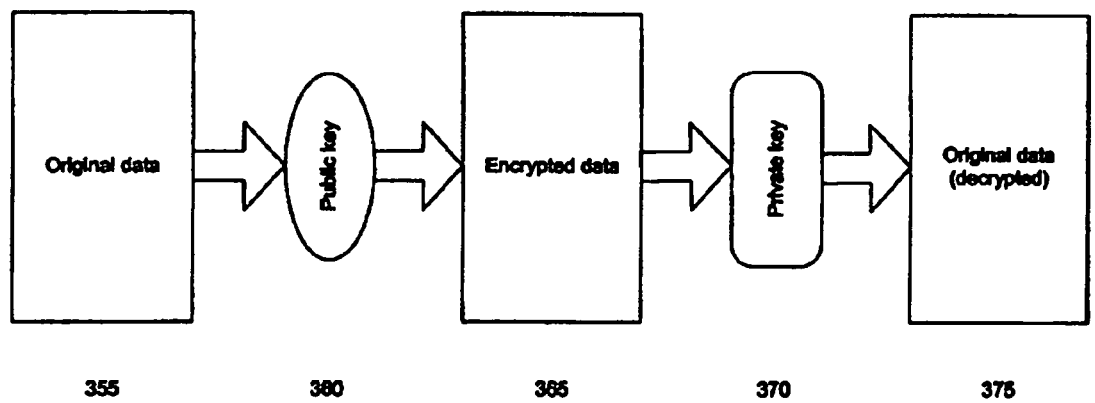

FIGS. 3A and 3B are block diagrams illustrating symmetric-key and public-key encryptions. As illustrated, the original data 305 is encrypted 315 using the symmetric-key 310. The same symmetric-key 310 is used to decrypt the data into its original form 320. The symmetric-key process 300 is extremely time-and processor-efficient, because only native processor instructions such as addition, bitwise logical-OR, bitwise logical-AND, and bitwise logical-exclusive-OR based on the key are used to encrypt and decrypt the text. However, the system is secured only to the extent that the two parties can keep the key secret.

In contrast, as illustrated by FIG. 3B, Public-key encryption 350 uses a public key 360, and a private key 370 to obtain the encrypted data 365 and decrypted data 375, respectively. In public-key encryption, the text 355 is encrypted 365, with the receiving party's public key 360. Upon reception, the receiver may decrypt 375 the encrypted text 365 using the corresponding private key 370. Since only the private key 370 is kept secret, while the public key 360 is openly distributed, the need for both parties to share a secret is eliminated.

Data is most often exchanged between parties encrypted with a symmetric key, and the symmetric key is encrypted with the public key of the receiving party and sent with the encrypted data. Thus, it has the performance benefits of symmetric encryption, with the advantages of public-key encryption. Encrypting a symmetric key with the recipient's public key is called a key exchange. The entire process of encrypting data with a symmetric key, encrypting the symmetric key, and sending encrypted data and encrypted symmetric key to the recipient is often referred to as "encrypting with the recipient's public key." It will be used this way for the rest of the description.

Figure 4:
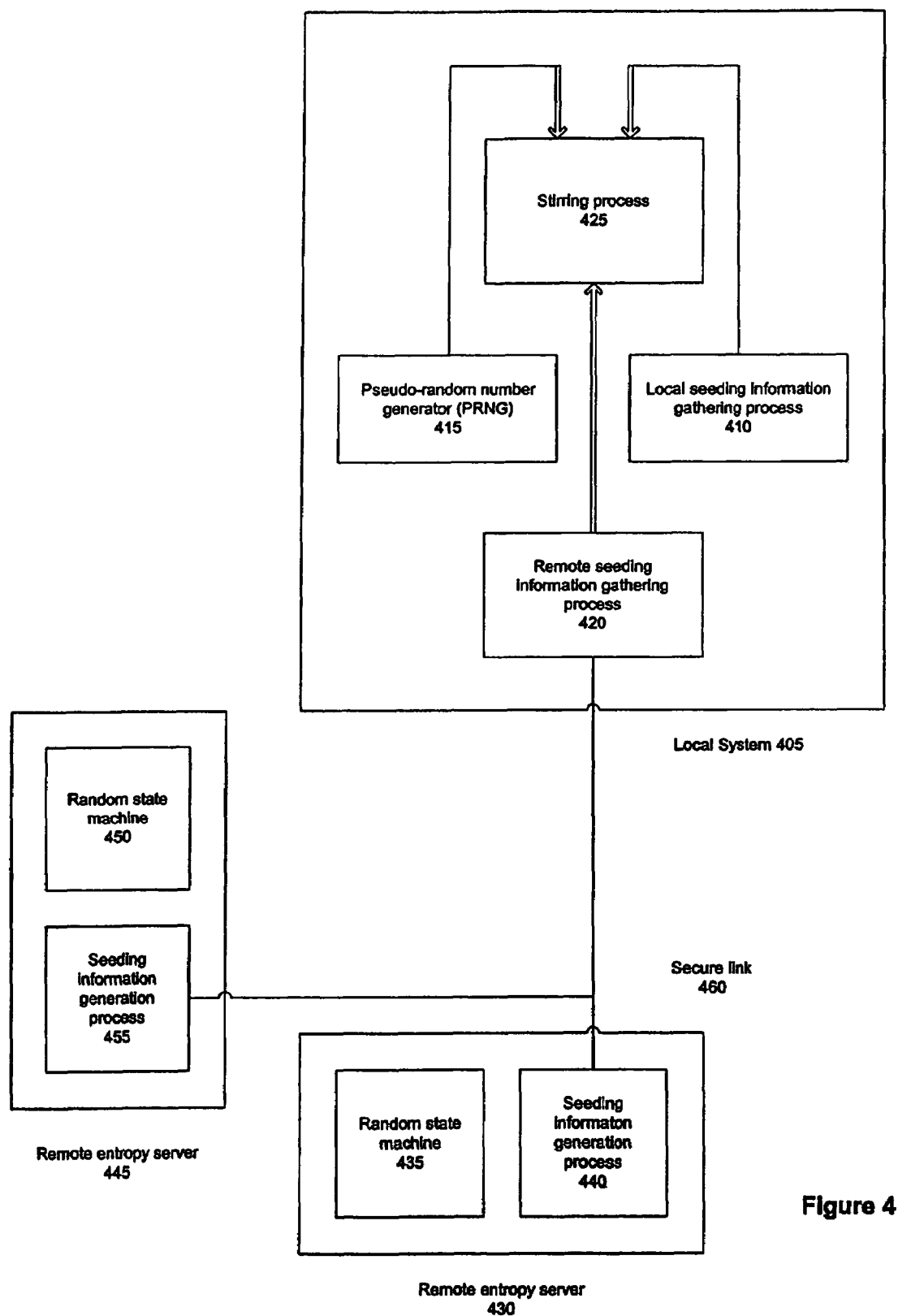
FIG. 4 is a block diagram illustrating logic for using a set of redundant entropy servers, according to one embodiment of the present invention.

FIG. 4 is a block diagram illustrating logic for enhancing entropy using a set of redundant entropy servers (see FIG. 2), according to one embodiment of the present invention. As illustrated, a local system 405 comprises a pseudo-random number generator (PRNG) 415, and at least a system of gathering local seeding information 410, and the stirring process 425. However, the local system 405, according to one embodiment of the present invention, also gathers remote seeding information 420 generated by one or more remote entropy servers 430 and 445. The remote entropy servers 430 and 445 comprise a random state machine 435 and 450, and generate seeding information 440 and 455 to later stir the PRNG 425.

Generally, a PRNG uses a random internal state and the stirring process to produce a stream of bits that satisfy various statistical tests of cryptographic randomness. The internal state is initialized with a random value called a seed. The seed must have a high level of entropy to ensure that the stream of bits is sufficiently hard to guess. Typically methods of gathering entropy include using seeding information gathered 410 from the local system 405 to seed and stir the PRNG 425. However, unless the seeding information gathered 410 from the local system 405 has sufficient entropy, an attacker can guess the output of the PRNG 415 with relative ease, and break into the system.

To provide further security, according to one embodiment of the present invention, additional seeding information is obtained 420 from one or more remote entropy servers 430 and 445, using a secured link 460. The remote entropy servers 430 and 445, which comprise random state machines 435 and 450, generate the additional seeding information 440 and 455. The process of securely obtaining seeding information 420 from one or more remote entropy servers 430 and 445 is repeated for redundant entropy servers. The additional seeding information generated 440 and 455, by the remote entropy servers 430 and 445, is gathered 420, in addition to the local seeding information 410, for the stirring process 425.

The stirring process 425 involves receiving and mixing of the gathered local seeding information 410, and remote seeding information 420. Using the combination of local and remote seeding information provides the unpredictable state that a system must have in order to fully secure the information. The security of a system depends on having a cryptographically secure PRNG algorithm. It is easy for an attacker to predict the state of a PRNG if only the local seeding information is utilized. However, with the stirring process 425 using local and remote seeding information 425, the much-needed entropy is amplified, making the system extremely secure, and difficult to break into for the attacker. Thus, the stirring process 425 of the present invention provides security against cryptographic breaks when two applications communicate with each other, or even when information is sent from one computer to another over the Internet.

According to one embodiment of the present invention, secure data collection from entropy servers 420 is done using a privacy protocol, such as a Secure Sockets Layer (SSL) or Transport Layer Security (TLS). This prevents an attacker from getting a copy of the data supplied by the entropy server and reproducing the PRNG state on his machine. If the exchange is not done securely, its value could be greatly diminished. Additionally, privacy protocols, such as SSL and TLS, themselves require unpredictable random numbers to be secured. Thus, in environments requiring remote entropy servers, the privacy protocols may not be acceptable for securing the exchange, and therefore, an alternative may be required.

According to one embodiment of the present invention, an entropy server, which is a machine or piece of software, maintains a constantly updated random state pool that is used to supply hosts with seeding information that can be stirred into their PRNG state value. An attacker is more likely to be able to negatively influence the initial state seeding, and succeed when only one entropy server is used. Hence, according to one embodiment of the present invention, a local host may use more than one entropy server so that the attacker cannot influence the initial state seed by compromising a single entropy server.

Figure 5:
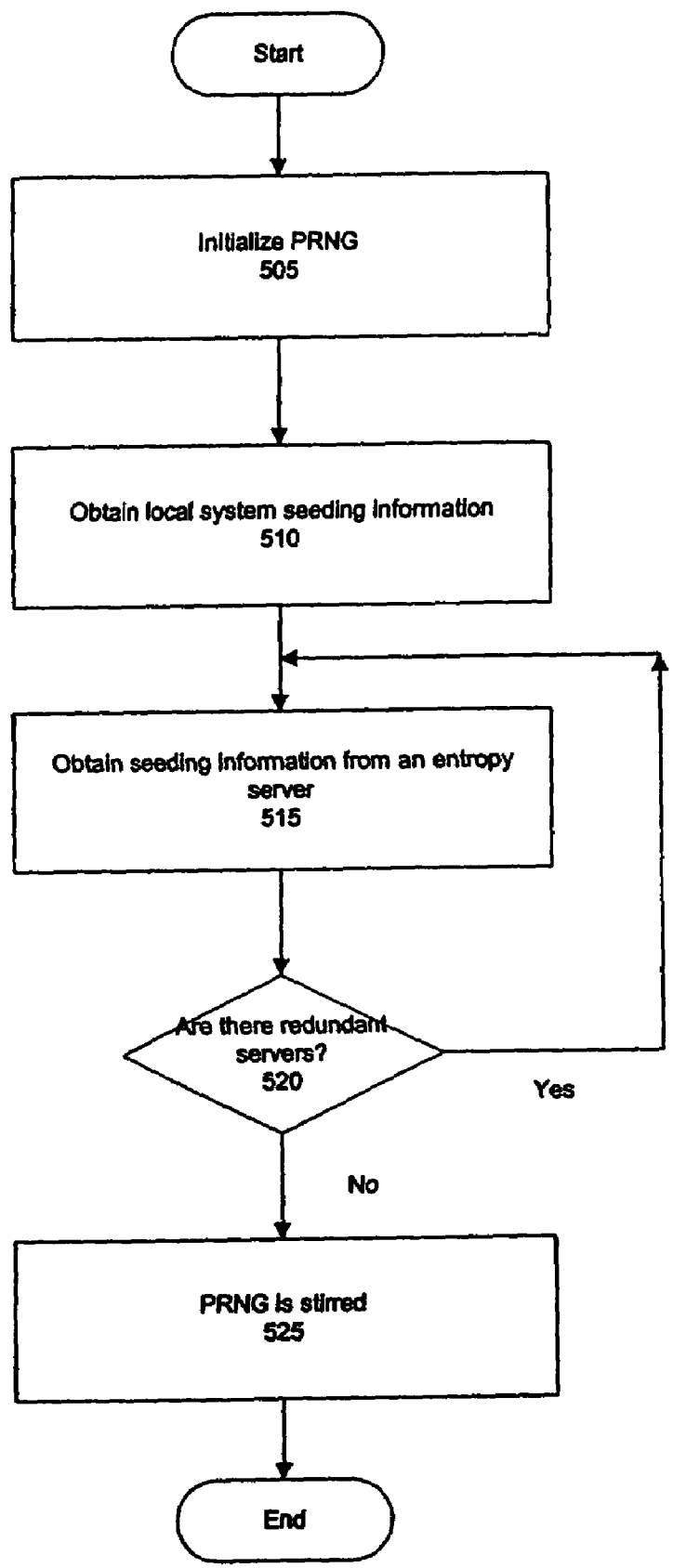
FIG. 5 is a flow diagram illustrating the process for using a set of redundant entropy servers, according to one embodiment of the present invention.

FIG. 5 is a flow diagram illustrating a process for enhancing entropy using a set of redundant entropy servers, according to one embodiment of the present invention. First, a PRNG is initialized in processing block 505. When a local host requires a PRNG, it seeds the initial state using locally unpredictable information in processing block 510. The local system seeding information is obtained in processing block 510. Further, seeding information is also securely obtained from one or more remote entropy servers in processing block 515. If there are no redundant servers in decision block 520, the PRNG is stirred in processing block 525. However, the process of obtaining seeding information is repeated for each redundant entropy server in decision block 520. According to one embodiment of the present invention, a local host may use more than one entropy server so that the attacker cannot influence the initial state seed by compromising a single entropy server. Finally, the PRNG is stirred using both the local and remote seeding information in processing block 525.

Figure 6:
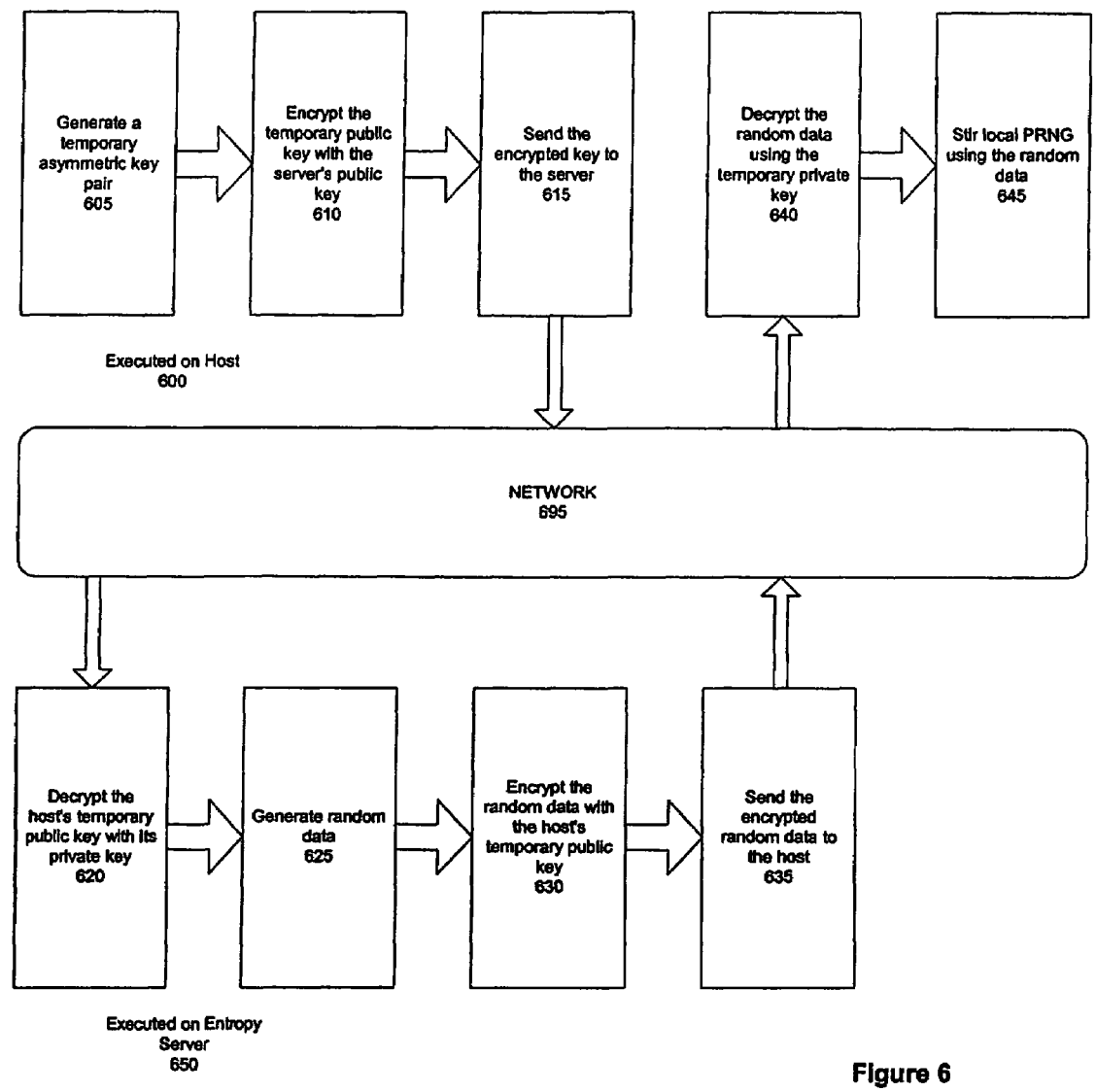
FIG. 6 is a block diagram illustrating logic for implementing a secure entropy collection protocol, according to one embodiment of the present invention.

FIG. 6 is a block diagram illustrating logic for implementing a secure entropy collection protocol, according to one embodiment of the present invention. In situations in which it is undesirable to use a standard privacy protocol or when a standard privacy protocol is unavailable, a secure entropy collection protocol may be used to interact with one or more entropy servers. For instance, in an environment requiring remote entropy server, the privacy protocols may not be acceptable for securing the exchange, because the privacy protocols themselves require unpredictable random numbers to be secured.

According to one embodiment of the present invention, on the host-side 600, a temporary asymmetric key pair is generated 605. The temporary public key created 605 on the host-side 600 is then encrypted with a remote entropy server's public key 610. The encrypted public key is then sent 615 to the remote entropy server 650. As discussed above, in a public-key system there is a corresponding private key to a public key. Generally, the private key is used to decrypt the corresponding public key's encrypted information. Thus, on the server-side 650, the host's temporary public key is then decrypted using the server's private key 620.

The server then generates random data 625, and encrypts it using the host's temporary public key 630. The encrypted random data is sent to the host 635. The random data is received on the host-side 600, and then decrypted using the host's temporary private key 640. Finally, the result of the decryption of the random data is used to stir the internal state of the local PRNG 645.

According to one embodiment of the present invention, random states from one or more external sources (e.g., redundant entropy servers) are added when gathering seeding information. This method provides additional security, because an attacker who is attempting to perform a cryptographic attack is likely to fail in predicting the random states from multiple external sources. In other words, the method allows the state of multiple independent systems to securely contribute to the strength of the local PRNG output. Thus, eliminating cryptographic breaks into a system by having strong and remote sources of randomness.

Figure 7:
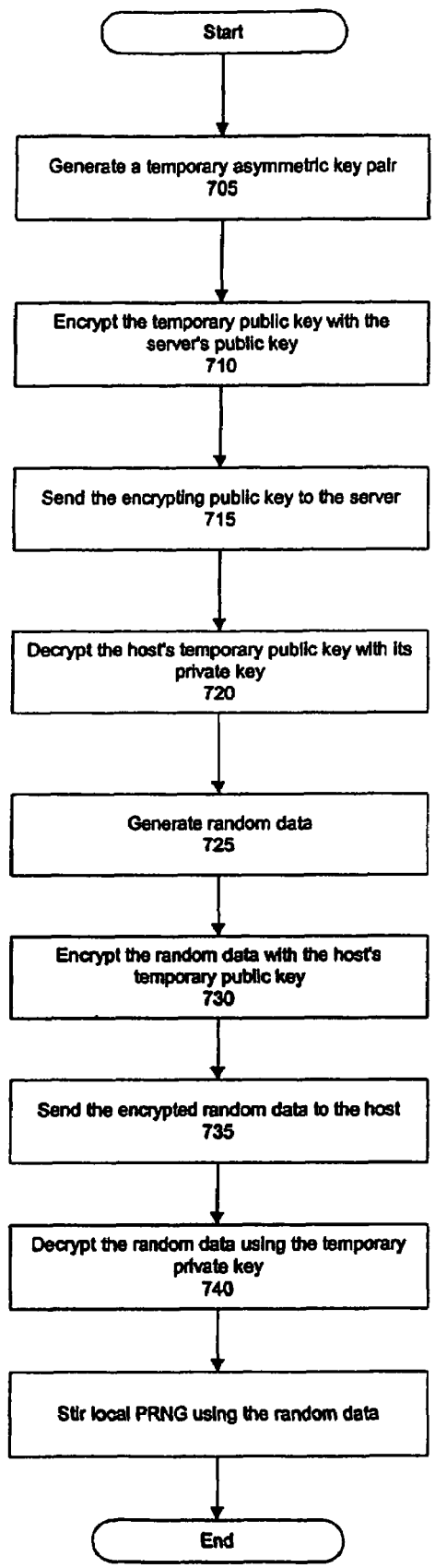
FIG. 7 is a flow diagram illustrating the process for implementing a secure entropy collection protocol, according to one embodiment of the present invention.

FIG. 7 is a flow diagram illustrating the process for implementing a secure entropy collection protocol, according to one embodiment of the present invention. In situations in which it is undesirable to use a standard privacy protocol or when a standard privacy protocol is unavailable, a secure entropy collection protocol may be used to interact with one or more entropy servers. First, on the host-side 600, a temporary asymmetric key pair is generated in processing block 705. The temporary public key created on the host-side is then encrypted with a remote server's public key in processing block 710. The encrypted public key is sent to the remote server in processing block 715. Then, on the server-side, the host's temporary public key is decrypted using the server's private key in processing block 720.

The server then generates random data in processing block 725, and encrypts it using the host's temporary public key in processing block 730. The encrypted random data is then sent to the host in processing block 735. The random data is received by the host, and then decrypted using the host's temporary private key in processing block 740. Finally, the result of the decryption of the random data is used to stir the internal state of the local PRNG in processing block 745.

What is claimed is:

1. A method comprising:

generating a temporary asymmetric key pair at a first computer system, wherein the temporary asymmetric key pair includes a temporary public key and a corresponding temporary private key;

encrypting the temporary public key with a public key of a second computer system;

sending the encrypted temporary public key from the first computer system to the second computer system;

decrypting the first computer system's temporary public key with a private key of the second computer system at the second computer system;

generating random data at the second computer system;

encrypting the random data with the first computer system temporary public key;

sending the encrypted random data from the second computer system to the first computer system;

decrypting the encrypted random data using the first computer system's temporary private key at the first computer system;

stirring a pseudo-random number generator of the first computer system using the random data generated by the second computer system, the stirring of the pseudo-random number generator including mixing local seeding information and remote seeding information to amplify entropy to enhance system security including securing cryptographic breaks between a plurality of software applications running at the second computer system; and transforming a predictable system status associated with the second computer system into an unpredictable system status through unpredictable random numbers generated via the mixing of the local seeding information and the remote seeding information, wherein transforming includes securely obtaining the remote seeding information from remote entropy servers and facilitating the mixing of the local seeding information and the remote seeding information, wherein the remote seeding information is obtained via a secure entropy collection protocol and is repeated for redundant entropy servers, the secure entropy protocol relying on the unpredictable random numbers, each of the remote entropy servers having a random state machine generating the remote seeding information.

2. The method of claim 1, wherein the public key of the second computer system comprises a published number.

3. The method of claim 1, wherein the private key of the second computer system comprises a secret number.

4. The method of claim 1, wherein the pseudo-random number generator cryptographically generates pseudo-random numbers.

5. The method of claim 4, wherein the pseudo-random numbers comprise a stream of bits.

6. A system comprising:

a first computer system coupled with a second computer system, the first computer system to generate a temporary asymmetric key pair, wherein the temporary asymmetric key pair includes a temporary public key and a corresponding temporary private key, encrypt the temporary public key with a public key of the second computer system, and send the encrypted temporary public key from to the second computer system; and the second computer system to decrypt the first computer system's temporary public key with a private key of the second computer system, stir a pseudo-random number generator including mixing local seeding information and remote seeding information to amplify entropy to enhance system security including securing cryptographic breaks between a plurality of software applications running at the second computer system, and transform a predictable system status associated with the second computer system into an unpredictable system status through unpredictable random numbers generated via the mixing of the local seeding information and the remote seeding information, wherein transforming includes securely obtaining the remote seeding information from remote entropy servers and facilitating the mixing of the local seeding information and the remote seeding information, wherein the remote seeding information is obtained via a secure entropy collection protocol and is repeated for redundant entropy servers, the secure entropy protocol relying on the unpredictable random numbers, each of the remote entropy servers having a random state machine generating the remote seeding information.

7. The system of claim 6, wherein the public key of the second computer system comprises a published number.

8. The system of claim 6, wherein the private key of the second computer system comprises a secret number.

9. The system of claim 6, wherein the pseudo-random number generator cryptographically generates pseudo-random numbers.

10. The system of claim 9, wherein the pseudo-random numbers comprise a stream of bits.

11. A machine-readable medium comprising instructions which, when executed, cause a machine to:

generate a temporary asymmetric key pair at a first computer system, wherein the temporary asymmetric key pair includes a temporary public key and a corresponding temporary private key;

encrypt the temporary public key with a public key of a second computer system coupled with the first computer system;

send the encrypted temporary public key from the first computer system to the second computer system;

decrypt the first computer system's temporary public key with a private key of the second computer system at the second computer system;

generate random data at the second computer system;

encrypt the random data with the first computer system's temporary public key;

send the encrypted random data from the second computer system to the first computer system; decrypt the encrypted random data using the first computer system temporary private key at the first computer system;

stir a pseudo-random number generator of the first computer system using the random data generated by the second computer system, wherein the stirring of the pseudo-random number generator including mixing local seeding information and remote seeding information to amplify entropy to enhance system security including securing cryptographic breaks between a plurality of software applications running at the second computer system; and transform a predictable system status associated with the second computer system into an unpredictable system status through unpredictable random numbers generated via the mixing of the local seeding information and the remote seeding information, wherein transforming includes securely obtaining the remote seeding information is securely obtained from remote entropy servers and facilitating the mixing of the local seeding information and the remote seeding information, wherein the remote seeding information is obtained via a secure entropy collection protocol, and is repeated for redundant entropy servers, the secure entropy protocol relying on the unpredictable random numbers, each of the remote entropy servers having a random state machine generating the remote seeding information.

12. The machine-readable medium of claim 11, wherein the public key of the second computer system comprises a published number.

13. The machine-readable medium of claim 11, wherein the private key of the second computer system comprises a secret number.

14. The machine-readable medium of claim 11, wherein the pseudo-random number generator cryptographically generates pseudo-random numbers.

15. The machine-readable medium of claim 14, wherein the pseudo-random numbers comprise a stream of bits.

* * * * *

UNITED STATES PATENT AND TRADEMARK OFFICE
CERTIFICATE OF CORRECTION

PATENT NO. : 7,664,269 B2 Page 1 of 1
APPLICATION NO. : 11/013572
DATED : February 16, 2010
INVENTOR(S) : Wood et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 858 days.

Signed and Sealed this

Twenty-eighth Day of December, 2010

David J. Kappos
*Director of the United States Patent and Trademark Office*